United States Patent [19]

Cheung

[11] Patent Number: 5,217,531

[45] Date of Patent: Jun. 8, 1993

[54] FLUID LOSS ADDITIVES FOR CEMENTING COMPOSITIONS

[75] Inventor: Ping-Sun R. Cheung, Spring, Tex.

[73] Assignee: The Western Company of North America, Houston, Tex.

[21] Appl. No.: 812,014

[22] Filed: Dec. 23, 1991

[51] Int. Cl.⁵ .................................. C04B 24/12
[52] U.S. Cl. .................................. 106/808; 106/727; 106/822; 106/823; 166/293; 166/294; 166/295
[58] Field of Search .............. 106/727, 808, 822, 823; 166/293, 294, 295

[56] References Cited

U.S. PATENT DOCUMENTS

| | | | |
|---|---|---|---|
| 3,415,319 | 12/1968 | Gibson | 166/295 |
| 3,994,852 | 11/1976 | Adams et al. | 166/295 |
| 4,480,693 | 11/1984 | Newlove et al. | 166/293 |
| 4,587,283 | 5/1986 | Hille et al. | 166/295 |
| 4,602,685 | 7/1986 | McKenzie et al. | 166/293 |
| 4,659,750 | 4/1987 | Sedillo et al. | 523/130 |

Primary Examiner—Mark L. Bell
Assistant Examiner—Anthony J. Green
Attorney, Agent, or Firm—Peter A. Bielinski

[57] ABSTRACT

Disclosed are cementing compositions and methods of using wherein the cementing compositions comprise: (a) aqueous solution, (b) hydraulic cement, (c) a N-vinylpyrrolidone-acrylamide random copolymer, and (d) a sulfonate containing cement dispersant. The copolymer is present in the composition in an amount of from 0.05 to 5.0 weight percent based on the weight of dry cement. Use of the present invention as a fluid loss additive will result in significant reductions in water loss rate.

19 Claims, No Drawings

FLUID LOSS ADDITIVES FOR CEMENTING COMPOSITIONS

FIELD OF THE INVENTION

The present invention relates generally to oil well cementing compositions, methods for their use and specifically to fluid loss additives for such compositions.

DESCRIPTION OF THE RELATED ART

In well completion operations, a casing or liner is suspended in the borehole, and cement is pumped down the casing. The cement flows back up the annulus between the outside of the casing and the wall of the borehole. One problem encountered in this operation is the loss of fluid from the cement slurry into the earth contacting the cement. Such fluid loss causes the dehydrated cement slurry to have reduced strength and an uncontrollable setting rate. In addition, fluid loss can result in damage to the adjacent strata formation.

Polymer compositions have commonly been added to cementing compositions as fluid loss additives. One prior art method discloses, for example, a fluid loss cement composition comprised of copolymers of acrylamide and N-vinyl-2-pyrrolidone. Another prior art method discloses a cementing formulation comprised of a copolymer of N-vinyl-pyrrolidone and styrenesulfonic acid and a cement dispersant composed of formaldehyde condensed naphthalene sulfonic acid.

The prior art cementing compositions are deficient in that liquid fluid loss additives have a variety of drawbacks, e.g. objectionable odor, difficulty in pouring, lack of stability resulting in polymer solids settling, or excessively long thickening times at low temperature because of undesirable retarding effects. One important deficiency of most liquid loss additives is its pourability at low temperatures. For most aqueous-based liquid fluid loss additives, the additive becomes unpourable or frozen at around 32° F. Even before freezing, the viscosity of the additive may become so high so as to be impractical to handle. Oil-based fluid loss additives which do not freeze contain a gelling agent to keep the additive particles suspended for accurate metering. At low temperatures the oil-based additives become very viscous and different to handle. Thus, the need exists in the industry for a liquid cement fluid loss additive that will give desirable thickening times at low temperatures and improved stability for consistent performance.

SUMMARY OF THE INVENTION

According to one embodiment, the present invention provides cementing compositions which comprise: (a) hydraulic cement; (b) a N-vinylpyrrolidone-acrylamide random copolymer; and (c) a sulfonate containing cement dispersant. The copolymer is present in the composition in an amount of from 0.05 to 5.0 weight percent based on the weight of dry cement. The dispersant is present in an amount of from 0.05 to 5.0 weight percent based on the weight of the dry cement.

According to another embodiment, the present invention provides a method of cementing a casing in a borehole having a bottom hole temperature of from about 80°-300° F. The method includes pumping a hydraulic cement slurry into the annulus between the casing and borehole, the slurry comprising: (a) aqueous solution; (b) hydraulic cement; (c) a random copolymer of N-vinylpyrrolidone and acrylamide present in the amount of from about 0.05 to 5.0 weight percent based on the dry weight of said cement; and (d) a sulfonate containing dispersant present in the amount of from about 0.05 to 5.0 weight percent based on the dry weight of the cement. After the pumping operation, the next step is allowing the slurry to set.

According to yet another embodiment, the present invention provides an aqueous hydraulic cement slurry which comprises: (a) an aqueous solution; (b) hydraulic cement; (c) a random copolymer of N-vinylpyrrolidone and acrylamide wherein the copolymer is present in the amount of from about 0.05 to 5.0 weight percent based on the dry weight of said cement; and (d) a sulfonate containing dispersant present in the amount of from about 0.05 to 5.0 weight percent based on the dry weight of the cement.

DETAILED DESCRIPTION OF THE INVENTION

The additive mixture utilized in the cement compositions of the present invention is comprised of an N-vinylpyrrolidone-acrylamide random copolymer and a sulfonate containing cement dispersant.

According to this invention, this additive mixture is well suited for use in wells having a bottom hole temperature of from about 80°-300° F. The fluid loss additive mixture of this invention is especially effective at low temperatures, e.g. below 100° F. Furthermore, this fluid loss additive mixture is especially effective in sodium silicate extended slurries where low fluid loss, short thickening time and high compressive strength can be obtained.

The fluid loss additive of the present invention, in emulsion form, does not freeze or become as viscous as the additives currently available. The fluid loss control additive of the present invention, used as an oil-based micro-emulsion, can retain its fluidity and pourability even at very low temperatures. Fluid loss additive emulsions according to the invention have been prepared having pour points of −14° F.

The polymers, utilized as fluid loss control additives, useful in this invention are random copolymers of N-vinylpyrrolidone and acrylamide. Such copolymers are readily commercially available in the form of a dry powder or as a micro-emulsion in oil. A suitable example is HE-300 ®, a copolymer in micro-emulsion form with 32% active polymer available from Drilling Specialties Inc. of Houston, Tex. This product had a pour point of −14° F. as determined by ASTM D97 Standard Test for Pour Point of Petroleum Oils, 1987.

The copolymer contains from about 1 to about 99 weight percent N-vinylpyrrolidine based on the total weight of the copolymer, more preferably, from about 20 to about 90 percent; and most preferably, from about 50 to about 70 percent by weight.

The copolymer contains from about 1 to about 99 percent by weight of acrylamide based on the total weight of the copolymer, more preferably, from about 10 to about 80 percent and most preferably from about 30 to about 50 percent by weight.

Cement compositions of the present invention containing the fluid loss additive mixture display improved pumpability. This feature, in turn, enhances drilling fluid removal and improves cement bonding to the formation and to the casings.

The cement portion of the composition of this invention may be any of the API classes of cement as defined in the American Petroleum Institute Bulletin entitled "Specification for Material & Testing for Well Cements" dated Jul. 1, 1990 ("API Spec. 10" fifth edition), and incorporated herein by reference. These include cements defined as classes A, B, C, D, E, F, G, and H in API Spec. 10. Preferably, cements defined as class A, B, C, G, and H are used; most preferable, cements defined as class G & H are used.

The aqueous solution of the present invention used to prepare the cement may be any such aqueous solution capable of allowing satisfactory fluid loss results.

Sulfonate containing dispersants useful in the compositions of the present invention are those which contain a sulfonate group including copolymers which have been sulfonated. Preferred dispersants include sodium napthalene formaldehyde sulfonate, sodium lignosulfonate and sulfonated styrene/maleic anhydride copolymers.

Other types of well known and conventional additives may be incorporated into the cement composition, such as other fluid loss additives or viscosifiers, retarders, accelerators, weight-adjusting materials or fillers and the like. These additives may include, for example, (1) heavy weight additives, such as hematite, ilmenite, silica flour and sand; (2) cement retarders such as lignins and lignosulfonates; and (3) additives for controlling lost circulation such as walnut hulls and cellophane flakes.

Use of a fluid loss additive of this invention will result in significant reductions in water loss rate. The copolymer may be present at an amount which will give the fluid loss necessary for the particular conditions. Concentrations from about 0.05 to about 5.0 percent by weight preferably from about 0.1 to about 2.0 percent by weight of the cement are effective. Under API standards, excellent fluid loss control (30–100 ml/30 min.) may be achieved by the addition of about 0.1 to about 0.5 percent of the copolymer by weight of the cement. Dispersant is present in an amount sufficient to disperse the components for example from about 0.05 to about 5.0 percent by weight of cement, preferably about 0.1 to about 2.0 percent, most preferably about 0.5 to about 1.5 percent. The present invention may best be employed at a ratio in a range of from about 10:1 to about 1:5 of fluid loss control agent to dispersant. Preferably, the range of fluid loss control agent to dispersant is from about 5:1 to 1:3, most preferably from 5:1 to 1:1.

The following examples are provided to further illustrate the invention. The examples are not intended to limit the scope of this invention.

EXAMPLES

The following tests were performed to examine the utility of the present invention as a low temperature fluid loss additive. All concentrations are given as percent by weight.

Cement compositions were prepared using Class H LeHarve Cement, mixing water, a dispersant and a low temperature fluid loss additive according to the present invention as set forth in Table I. Mixing water for these examples was deionized water except noted. Synthetic sea water was prepared using sea salt at 3.8 weight percent. Thickening time tests were run using API liner and casing cementing well-simulation test schedules according to API Specification 10, Appendix E. Fluid loss tests were run according to API Spec 10, Appendix F. Compressive strength tests were run according to API Spec 10, Appendix D. An Ultrasonic Cement Analyzer (UCA) was used to determine the compressive strength of the initial set of slurries.

TABLE I

Slurry Properties With N-Vinylpyrrolidone-Acrylamide Copolymer

| N-Vinylpyrrolidone-Acrylamide Copolymer (weight %) | Sodium Naphthalene Formaldehyde Sulfonate (weight %) | NaCl (%) | Thriftylite (%) | WR-15 (%) | WR-6 (%) | SF-4 (%) | $H_2O$ (%) | Density (ppg) | BHCT (°F.) |
|---|---|---|---|---|---|---|---|---|---|
| 0.30 | 0.5 | 5 | — | — | — | — | 42 | 16.0 | 100 |
| 0.225 | 0.4 | — | — | — | — | — | 42 | 16.0 | 120 |
| 0.30 | 0.5 | — | — | — | — | — | 42 | 16.0 | 120 |
| 0.30 | 0.5 | 3 | — | — | — | — | 42 | 16.0 | 120 |
| 0.225 | 0.4 | — | — | — | — | — | 42 | 16.0 | 167 |
| 0.30 | 0.5 | — | — | — | — | — | 42 | 16.0 | 167 |
| 0.375 | 0.7 | — | — | 0.1 | — | — | 42 | 16.0 | 197 |
| 0.375 | 0.7 | — | — | 0.1 | — | 35 | 46 | 16.6 | 197 |
| 0.45 | 1.0 | — | — | — | 0.3 | 35 | 46 | 16.6 | 233 |
| 0.60 | 1.0 | — | — | — | 0.3 | 35 | 46 | 16.6 | 233 |
| 0.75 | 1.0 | — | — | — | 0.5 | 35 | 46 | 16.6 | 270 |
| 0.375 | 0.7 | — | 1.0 | — | — | — | 60 | 14.5 | 120 |
| 0.60 | 1.0 | — | 1.5 | — | — | — | 90 | 13.0 | 120 |
| 0.60 | 1.0 | — | 0.5 | — | — | — | 60 | 14.5 | 197 |
| 0.75 | 1.0 | — | 1.0 | 0.1 | — | — | 90 | 13.0 | 197 |
| 0.60 | 1.0 | — | 1.5 | — | — | — | 90* | 13.0 | 120 |
| 0.375 | 0.7 | — | 1.0 | — | — | — | 60* | 14.5 | 120 |

| N-Vinylpyrrolidone-Acrylamide Copolymer (weight %) | Sodium Naphthalene Formaldehyde Sulfonate (weight %) | BHST (°F.) | Fluid Loss (cc/30 min) | Thickening Time (hr:min) | Initial Set (hr:min) | Compressive Strength (psi) 8 hr | 12 hr | 24 hr |
|---|---|---|---|---|---|---|---|---|
| 0.30 | 0.5 | 120 | 90 | 3:53 | 6:01 | 585 | 1690 | 3538 |
| 0.225 | 0.4 | 140 | 82 | 3:03 | 3:42 | 1870 | 2652 | 3900 |
| 0.30 | 0.5 | — | 56 | 3:21 | — | — | — | — |
| 0.30 | 0.5 | — | 86 | 2:35 | — | — | — | — |
| 0.225 | 0.4 | — | 156 | — | — | — | — | — |
| 0.30 | 0.5 | — | 82 | 2:10 | — | — | — | — |
| 0.375 | 0.7 | — | 52 | 4:12 | — | — | — | — |
| 0.375 | 0.7 | 230 | 56 | 4:58 | 5:05 | 2110 | 3096 | 4263 |
| 0.45 | 1.0 | — | 130 | — | — | — | — | — |

TABLE I-continued

Slurry Properties With N-Vinylpyrrolidone-Acrylamide Copolymer

| | | | | | | | | |
|---|---|---|---|---|---|---|---|---|
| 0.60 | 1.0 | — | 50 | 3:25 | — | — | — | |
| 0.75 | 1.0 | 290 | 60 | 2:50 | 5:48 | 1500 | 2914 | 3163 |
| 0.375 | 0.7 | 140 | 66 | 2:54 | 3:05 | 786 | 1112 | 1550 |
| 0.60 | 1.0 | 140 | 52 | 3:26 | 3:37 | 270 | 420 | 596 |
| 0.60 | 1.0 | 230 | 52 | 3:14 | 4:43 | 970 | 1350 | 1775 |
| 0.75 | 1.0 | 230 | 58 | 2:46 | 4:33 | 520 | 720 | 900 |
| 0.60 | 1.0 | — | 84 | 2:45 | — | — | — | |
| 0.375 | 0.7 | — | 106 | 1:40 | — | — | — | |

*synthetic sea water was used

The effective use of the present invention as a fluid loss additive is highly dependent on the concomitant use of a sulfonate containing dispersant. Table II illustrates the fluid loss control properties of the present invention in combination with a variety of dispersants. The cement slurries in Table II were prepared using Class H LeHarve Cement, 46% by weight deionized water, 0.1 gallon/sack of cement of N-vinylpyrrolidone-acrylamide random copolymer emulsion (0.3 weight percent) and the dispersant identified in the table. The copolymer emulsion contained 32% by weight N-vinylpyrrolidone-acrylamide random copolymer. The results show that dispersants containing sulfonate groups performed best. Dispersants also containing carboxylate groups, e.g. sulfonated styrene/maleic anhydride copolymer, performed less well while citric acid containing only carboxylate groups had a negative effect on fluid loss. The sodium naphthalene formaldehyde was Lomar D, available from Henkel Corporation. The sulfonated styrene/maleic anhydride copolymers had mole ratios of 1:1 and 3:1 of styrene to maleic anhydride and are available from National Starch and Chemical Corporation. The 3:1 polymer is called Versa TL3 and the 1:1 polymer is called Narlex D-72.

TABLE II

Effect of Dispersants on Fluid Loss

| Dispersant | Fluid Loss at 167° F. (cc/30 min) |
|---|---|
| None | 492 |
| 0.5% sodium naphthalene formaldehyde sulfonate | 102 |
| 0.5% sodium lignosulfonate | 258 |
| 0.5% sulfonate styrene/maleic anhydride copolymer (1:1) | 370 |
| 0.5% sulfonated styrene/maleic anhydride copolymer (3:1) | 368 |
| 0.5% citric acid | 715 |

Based on the results of the study depicted in Table I, further experimentation with sodium naphthalene formaldehyde sulfonate dispersant was conducted and these results are illustrated in Table III. Table III shows the fluid loss control is optimized with N-vinylpyrrolidone-acrylamide random copolymer to sodium naphthalene formaldehyde sulfonate dispersant ratios of between about 10:1 to about 1:5. The slurries used for Table III were prepared using Class H LeHarve Cement, 46% by weight deionized water and 0.6% by weight of the mixture of N-vinylpyrrolidone-acrylamide random copolymer and sodium naphthalene formaldehyde sulfonate at the various ratios.

TABLE III

Effect of N-vinylpyrrolidone-Acrylamide/Sodium Naphthalene Formaldehyde Sulfonate Ratio on Fluid Loss

| Weight Ratio n-vinylpyrrolidone-acrylamide:sodium naphthalene formaldehyde sulfonate | Fluid Loss at 167° F. (cc/30 min) |
|---|---|
| 100:0 | 294 |
| 85:15 | 126 |
| 75:25 | 112 |
| 50:50 | 130 |
| 25:75 | 285 |
| 15:85 | 383 |
| 0:100 | 543 |

While particular embodiments of the invention have been described, it is to be understood that such descriptions are presented for purposes of illustration only and that the invention is not limited thereto and that reasonable variations and modifications, which will be apparent to those skilled in the art, can be made without departing from the spirit or scope of the invention.

What is claimed is:

1. An aqueous hydraulic cement slurry which comprises water, a hydraulic cement, and a fluid loss additive consisting essentially of a random copolymer of N-vinylpyrrolidone and acrylamide wherein the copolymer is present in an amount of from about 0.05 to 5.0 weight percent based on the dry weight of said cement and a sulfonate containing dispersant present in the amount sufficient to give a copolymer to dispersant ratio of from about 10:1 to about 1:5.

2. The cement slurry of claim 1 wherein the copolymer contains from about 1 to about 99 weight percent of n-vinylpyrrolidone based on the total weight of the copolymer and from about 1 to about 99 weight percent of acrylamide based on the total weight of the copolymer.

3. The cement slurry of claim 1 wherein the copolymer contains from about 10 to about 80 weight percent of n-vinylpyrrolidone based on the total weight of the copolymer and from about 10 to about 80 weight percent of acrylamide based on the total weight of the copolymer.

4. The cement slurry of claim 1 wherein the copolymer contains from about 30 to about 50 weight percent of n-vinylpyrrolidone based on the total weight of the cement and from about 30 to about 50 weight percent of acrylamide based on the total weight of the copolymer.

5. The cement slurry of claim 1 wherein the copolymer is a micro-emulsion of the copolymer in oil.

6. The cement slurry of claim 1 wherein the sulfonate containing dispersant is selected from the group consisting of sodium naphthalene formaldehyde sulfonate, sodium lignosulfonate, and sulfonated styrene/maleic anhydride copolymer.

7. The cement slurry of claim 6 wherein the dispersant is present in the amount of from about 0.05 to about 5.0 weight percent based on the dry weight of cement.

8. The cement slurry of claim 6 wherein the dispersant is present in an amount of from about 0.1 to about 2.0 weight percent based on the dry weight of the cement.

9. A method of cementing a casing in a borehole having a bottom hole temperature of from about 80°–300° F. comprising:

(1) pumping a hydraulic cement slurry into the annulus between the casing and borehole, the slurry comprising water, hydraulic cement and a fluid loss additive consisting essentially of a copolymer of N-vinylpyrrolidone and acrylamide present in an amount of from about 0.01 to 5.0 weight percent based on the dry weight of said cement; and a sulfonate containing dispersant present in an amount of from about 0.01 to 5.0 weight percent based on the dry weight of the cement; and (2) allowing the slurry to set.

10. The method of claim 9 wherein the bottom hole temperature is less than 100° F.

11. The method of claim 9 wherein the copolymer contains from about 1 to about 99 weight percent of n-vinylpyrrolidone based on the total weight of said copolymer and from about 1 to about 99 weight percent of acrylamide based on the total weight of said copolymer.

12. The method of claim 9 wherein the copolymer is a micro-emulsion of the copolymer in oil.

13. The method of claim 9 wherein the dispersant is selected from the group consisting of sodium naphthalene formaldehyde sulfonate, sodium lignosulfonate, and sulfonated styrene/maleic anhydride copolymer.

14. The method of claim 13 wherein the dispersant is present in the amount of from about 0.05 to about 5.0 weight percent based on the dry weight of cement.

15. The method of claim 13 wherein the dispersant is present in an amount of from about 0.1 to about 2.0 weight percent based on the dry weight of the cement.

16. A hydraulic cement composition for use in a borehole having a down hole temperature of from about 80°–300° F. comprising hydraulic cement and a fluid additive consisting essentially of a copolymer of N-vinylpyrrolidone and acrylamide present in an amount of from about 0.05 to 5.0 weight percent based on the dry weight of said cement and a sulfonate containing dispersant present in the amount of from about 0.05 to 5.0 weight percent based on the dry weight of the cement.

17. The cement composition of claim 16 wherein the copolymer contains from about to about 99 weight percent of n-vinylpyrrolidone based on the total weight of said copolymer and from about 1 to about 99 weight percent of acrylamide based on the total weight of said copolymer.

18. The cement composition of claim 16 wherein the dispersant is selected from the group consisting of sodium naphthalene formaldehyde sulfonate, sodium lignosulfonate, and sulfonated styrene/maleic anhydride copolymer.

19. The cement composition of claim 16 wherein the dispersant is present in the amount of from about 0.1 to about 2.0 weight percent based on the dry weight of cement.

* * * * *